(12) United States Patent
Aubert

(10) Patent No.: US 6,878,752 B1
(45) Date of Patent: Apr. 12, 2005

(54) METHOD FOR MAKING ONE-CONTAINER RIGID FOAM

(75) Inventor: James H. Aubert, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 327 days.

(21) Appl. No.: 10/145,994

(22) Filed: May 14, 2002

(51) Int. Cl.$^7$ ................................................. C08J 9/12
(52) U.S. Cl. ........................... 521/78; 521/98; 521/131
(58) Field of Search ............................. 521/78, 98, 131

(56) References Cited

U.S. PATENT DOCUMENTS

| | | | | |
|---|---|---|---|---|
| 3,912,665 A | * | 10/1975 | Spitzer et al. | |
| 3,912,666 A | * | 10/1975 | Spitzer et al. | |
| 3,912,667 A | * | 10/1975 | Spitzer et al. | |
| 4,422,877 A | * | 12/1983 | Spitzer et al. | |
| 4,559,369 A | * | 12/1985 | Bauman et al. | |
| 4,996,240 A | * | 2/1991 | Osipow et al. | |
| 5,180,753 A | * | 1/1993 | Osipow et al. | |
| 5,391,317 A | | 2/1995 | Smits | |
| 6,114,403 A | | 9/2000 | Mercando et al. | |
| 6,225,365 B1 | | 5/2001 | Zerifati et al. | |
| 6,234,826 B1 | | 5/2001 | Wilber et al. | |

OTHER PUBLICATIONS

Salyer, et al., "Evaluation of Four Foaming Techniques for Inflating a PK–2 Life Raft," Journal of Cellular Plastics, vol. 4, No. 9, Sep. 1968.

Nimitz, (ETEC), "New Foam Blowing Agents Containing Fluoroiodocarbons," presented at SPI Polyurethanes Conference, Boston, MA, 10/10–12/94.

* cited by examiner

*Primary Examiner*—Morton Foelak
(74) *Attorney, Agent, or Firm*—Elmer A. Klavetter

(57) ABSTRACT

A method of making a one-container foam by dissolving a polymer in liquified gas at a pressure greater than the vapor pressure of the liquified gas and than rapidly decreasing the pressure within approximately 60 seconds to foam a foam. The foam can be rigid and also have adhesive properties. The liquified gas used is $CF_3I$ or mixtures thereof.

23 Claims, 1 Drawing Sheet

METHOD FOR MAKING ONE-CONTAINER RIGID FOAM

This invention was made with Government support under Contract No. DE-AC04-94AL85000 awarded by the Department of Energy. The Government has certain rights in the invention.

BACKGROUND OF THE INVENTION

The invention relates to a method of making foam and more particularly, to a method of making rigid foam produced from components contained in a single container.

Uses of foams include protection of sensitive components, such as electronics, formation of structures, insulation, and in security applications. Rigid structural foams have been developed for some applications but have been based upon two component, reacting systems such as polyurethanes that require complex hardware designs and high maintenance (I. O. Salyer, J. L. Schwendenian, and C. E. McClung, J. Cellular Plastics, 1968, 4(9)). Polyurethane foams also have a significant set-up time for the requirements of some applications.

Smits (U.S. Pat. No. 5,391,317, issued on Feb. 21, 1995) sought to manufacture foam having both good dimensional stability and thermal insulation using hydrocarbons as blowing agents. This reference taught the use of a particular mixture of $C_{5-6}$ alicyclic alkanes, isopentane and n-pentane blowing agents in particular molar percents, in combination with a polyol mixture made up of an aromatic initiated polyether polyol, an aromatic polyester polyol, and a different amine-initiated polyether polyol. As the aromatic-initiated polyether polyol, Smits suggested using an alkylene oxide adduct of a phenolformaldehyde resin. The particular mixture of alicyclic and isomeric aliphatic alkane blowing agents is taught by Smits as producing foam having good thermal insulation values.

Wilson et al. (U.S. Pat. No. 6,245,826, issued on Jun. 12, 2001) describe a polyisocyanate based rigid closed cell foam, prepared by reacting an organic isocyanate with a polyol composition in the presence of a blowing agent, with good thermal insulation properties and dimensional stabilities.

Zerafati et al. (U.S. Pat. No. 6,225,365, issued on May 1, 2001) describe a polyvinyl chloride ("PVC") foam prepared with physical blowing agents, more particularly to PVC foam blown with one or more gaseous hydrofluorocarbons ("HFC"s) such as 1,1,1,2-tetrafluoroethane.

Mercando et al. (U.S. Pat. No. 6,114,403, issued on Sep. 5, 2000) describe rigid polyurethane foam by reacting an organic polyisocyanate and a polyol in the presence of a blowing agent, a cell stabilizer and a catalyst composition.

DESCRIPTION OF SPECIFIC EMBODIMENTS

Figure 1:
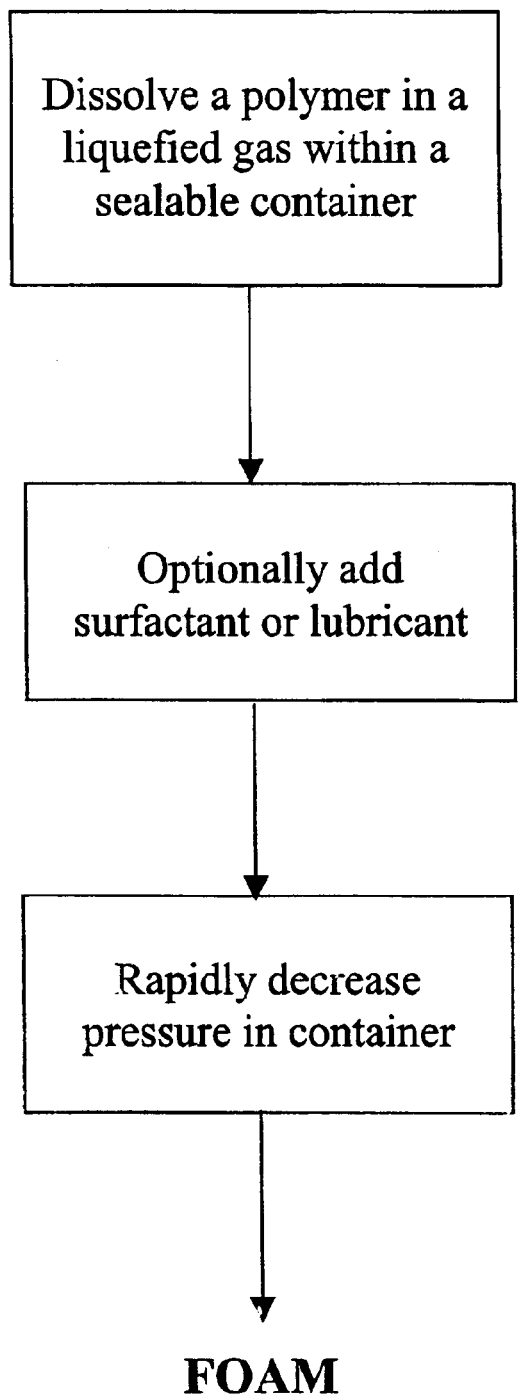
FIG. 1 shows a schematic of the one-container foam process.

The present invention is a method, described in the schematic of FIG. 1, of making polymer foam where all of the components to make the foam are present in one-container and the reduction of pressure in the container initiates making the foam. The components are at least one polymer dissolved in a liquefied gas, such as a typical refrigerant. In addition, the solution can contain a surfactant, a plasticizer, and other additives. Under pressure, the gas is liquefied and dissolves the polymer and other ingredients. When the pressure in the container is reduced quickly, such as by breaking the container or opening a valve on the container, the liquid boils and foams the polymer. As the solvent is vaporized, the polymer comes out of solution and becomes glassy or crystalline and forms rigid foam, generally in less than approximately 60 seconds.

Rigid foams have applications that include the formation of structures that need rapid deployment and that have structural integrity. The method of the present invention provides rigid foam that has low toxicity, is nonflammable, is environmentally benign, sets up quickly (generally less than one minute) and has a high expansion ratio (approximately 25:1 up to approximately 100:1). The expansion ratio is defined as the foam volume divided by the original solution volume. One-container polystyrene foam can be dissolved easily in many organic solvents. This is fundamental to the method of preparation where the starting polymer is dissolved in a solvent (a liquefied gas). The foam can also be used as a spray adhesive as the foam can be made to have adhesive properties.

To determine suitable liquefied gases that were nonflammable, nontoxic and environmentally safe, numerous compounds were evaluated, including $CO_2$, $CF_3CFCF_2$, $CF_3CH_2F$, $C_4F_8$, $CF_3CH_3CF_2H$, $CF_3CFH_2CF_2H$, $CF_3CFH_2CF_3$, $CF_3I$, $C_2F_{51}$, $C_3F_{71}$, and mixtures of $CF_3I$ with hydrogen-fluorine-carbon-containing compounds. Only $CF_3I$ and some gas mixtures (in which the predominant component was $CF_3I$) were determined to be able to dissolve the high molecular weight polymers at room temperatures to satisfy the requirements of the present invention. $CF_3I$ (trifluoroiodomethane) has been used as a physical blowing agent in two-component polyurethane foams, (e.g., Nimitz, SPI Polyurethanes Conference, Boston, Mass., 1994).

A number of polymers are soluble in $CF_3I$, including polystyrene, polystyrene copolymers (such as the polystyrene/butadiene copolymer), poly (alphamethylstyrene), poly(methylmethacrylate), methacrylate copolymers (such as the polybutylmethacrylate/isobutylmethacrylate copolymer), polyisoprene, and polyethylene oxide. In addition, some epoxy prepolymers and some polyurethane prepolymers are also soluble in $CF_3I$. The concentrations of the polymer and the additives that are dissolved in $CF_3I$ have a great effect on the ability of the solution to foam, on the foam expansion, on the foam stability, and on other foam properties.

Both polymethylmethacrylate and polystyrene are soluble in $CF_3I$ and can be formulated to produce rigid one-container foams. An example of a foam formulation containing high-molecular weight polymethylmethacrylate (PMMA) is: 1.077 gm PMMA, 0.252 gm tetrahydrofuran (THF) solvent, and 3.30 gm $CF_3I$. In this formulation, the THF acted as a cosolvent to lower the solution viscosity and to plasticize the PMMA. This solution was clear and very viscous at room temperature. The solids content of the solution was 23% by weight and approximately 40% by volume. The lid of the vial was sealed with epoxy adhesive in order to contain the pressure of the liquefied gas. The room temperature vapor pressure of $CF_3I$ is 71 psi. The pressure in the container should be greater than the vapor pressure of the liquefied gas at the temperature of use. The foams were dispensed by breaking open the glass vial with extreme caution and in a controlled environment. The solution of this example generated foam of 90 $cm^3$ initially which expanded in five minutes to 110 $cm^3$ (expansion ratio of 40). The foam density at this expansion was 0.01 $gm/cm^3$ (0.6 $lb/ft^3$). As expected, the foam was brittle.

Note that the foam density is a calculated quantity that could have various meanings since some of the ingredients are volatile and will leave the foam over time. In this example, the density was based upon the quantity of non-volatile solids, PMMA, divided by the measured volume. Initially, the actual foam density would be higher as the foam contains both THF and $CF_3I$, but over time it would tend to approach this-calculated value as the THF and $CF_3I$ diffuse out of the foam.

An example of a foam formulation containing high-molecular weight polystyrene (PS) is: 3.0 gm PS and 5.0 gm $CF_3I$. This solution was clear and very viscous at room temperature. The solids content of the solution was 37.5% by weight and approximately 57% by volume. The solution generated foam of 55 cm$^3$ (expansion ratio of 11:1). The foam density at this expansion was 0.055 gm/cm$^3$ (3.4 lb/ft$^3$). As expected, the foam was brittle.

There are a number of approaches to prepare tougher, or less brittle, one-container foams. One approach is to utilize soluble polymers that have a lower glass transition temperature, $T_g$. Ideally, the glass transition temperature would be near room temperature. Butylmethacrylate/isobutylmethacrylate copolymer (50/50 copolymer) is one such polymer and has a $T_g$ of 35° C. Foams prepared this polymer had very high expansion (typically 70:1), good volumetric stability, and were stretchy and tough foams. In addition, significantly better adhesion can be obtained than those prepared with polystyrene or polymethylmethacrylate.

Other low-$T_g$ polymers that are soluble in $CF_3I$ are some copolymers of polystyrene and butadiene (commonly utilized to impart high-impact resistance to polystyrene). Their $T_g$ is below room temperature. They foam well with high expansion and are exceedingly tough. A typical expansion ratio was 50:1. However, because of the low-$T_g$, they are not volumetrically stable. Over relatively short times their volume shrinks. The half-life of the volume is typically 30 minutes. They could have potential use if the required life of the foam is short. An example of a foam formulation with a copolymer of polystyrene and butadiene is: 2.0 grams of multiblock polystyrene-butadiene copolymer (such as Firestone, Stereon 840A) and 4.0 grams of $CF_3I$ at a pressure of greater than approximately 100 psi. When the pressure was rapidly reduced, by breaking open the glass vial, 200 cm$^3$ of foam was produced corresponding to an expansion of approximately 55:1. The foam was very tough. The volumetric stability of this foam was poor as it had a half-life of less than 15 minutes. An approach to increase the half-life is to add another miscible liquefied gas-cosolvent that is not a solvent for the polymer. Significant improvement in the half-life of this foam was obtained by utilizing a liquefied gas mixture of 14% 1,1,1,2-tetrafluoroethane ($CF_3CH_2F$) and 86% $CF_3I$. For this formulation, the half-life was increased to 30 minutes. Still further improvements in the half-life have been obtained by preparing blends of polystyrene and the multiblock copolymer polystyrene-butadiene.

Other low-$T_g$ polymers that could be utilized in one-container foams include: poly(n-butyl methacrylate) with a $T_g$ of 20° C., poly(isobutylmethacrylate), poly(t-butylaminoethylmethacrylate) with a $T_g$ of 33° C., polyethylene oxide with a melting point, $T_m$, of 65° C., styrene-ethylene-butylene triblock copolymer, styrene-ethylene-butylene triblock copolymer, styrene-butadiene-styrene triblock copolymer, styrene-isoprene-styrene triblock copolymer, polybutadiene, and polyisoprene. It is obvious that there are many other low-$T_g$ polymers that could work in this invention in a similar manner.

In another approach to prepare a tougher, less brittle, one-container foam, with good expansion and good volumetric stability, plasticizers were added to the solution. Numerous plasticizers were evaluated in order to increase the toughness of polystyrene one-container foams using a medium molecular weight polystyrene (such as a polystyrene with a molecular weight greater than approximately 200,000 grams/mole and less than 300,000 grams/mole). Various chemicals that were tried that did not significantly increase the toughness or inhibited the ability of the solution to foam included: diamines, polymeric diisocyanate, nonyl phenol, mineral oil, polybutadiene diol, polybutadiene (phenyl-terminated), epoxy resins, silicone resins, and polyvinylmethylether. One compound that did increase foam toughness and improved polystyrene foam expansion was a low-molecular weight polymer, coumarone-indene. Formulations were prepared with up to equal parts of polystyrene and coumarone-indene. The formulations foamed more slowly, had significantly higher expansion, and produced tougher foams. The foams were volumetrically stable. Over a couple of days, the foams gradually became more and more brittle, which is probably due to evaporation of the coumarone-indene and also due to loss of $CF_3I$.

It is obvious that numerous commercial plasticizers could be utilized and helpful in one-container foams. A number of commercial plasticizers for polystyrene were evaluated and are listed in Table 1. The table provides the measured performance as indicated by the initial foam volume produced and the volumetric stability over an hour.

TABLE I

Time-dependent foam volume (cm) with different plasticizers in a formulation containing 2 gm polystyrene (molecular weight 250000 gm/gm-mole), and nominally 4.0 gm $CF_3I$.

| Plasticizer | $CF_3I$ | Initial volume | 15-minute volume | 30-minute volume | 60-minute volume |
|---|---|---|---|---|---|
| Diethylene glycol dibenzoate | 4.0 | 280 | 305 | 250 | 190 |
| Dipropylene glycol dibenzoate | 4.5 | 290 | 245 | 210 | 200 |
| Polyethylene glycol 200 dibenzoate | 4.5 | 260 | 375 | 350 | 320 |
| Dimethyl isophthalate | 4.3 | 155 | 170 | 160 | 150 |
| Tetrahydro furfuryl oleate | 4.7 | 100 | 95 | 90 | 88 |
| Chloroparaffin, 41% Cl | 4.1 | 160 | — | 200 | 180 |
| Chloroparaffin, 50% Cl | 4.3 | 190 | 220 | 200 | 190 |
| Chloroparaffin, 60% Cl | 4.2 | 230 | 340 | 330 | 300 |
| Chloroparaffin, 70% Cl | 4.0 | 95 | 80 | 75 | 70 |
| 2-ethylhexyl di-phenylphosphate | 4.5 | 270 | 50 | 45 | 30 |
| Tricresyl phosphate | 4.6 | 260 | 95 | 75 | 65 |
| Triphenyl phosphate | 5.3 | 290 | 190 | 120 | 80 |
| Butyl benzyl phthalate | 4.4 | 250 | 80 | 60 | 50 |
| Butyl octal phthalate | 4.7 | 200 | 150 | 135 | 110 |
| Dicapryl phthalate | 4.5 | 160 | 180 | 150 | 145 |
| di-(2-ethylhexyl) phthalate | 4.5 | 240 | 185 | 150 | 125 |
| Diethyl phthalate | 4.3 | 200 | 130 | 95 | 65 |
| Diisobutyl phthalate | 4.0 | 185 | 75 | 60 | 50 |
| Diisodecyl phthalate | 4.4 | 150 | 205 | 200 | 190 |
| Diisooctyl phthalate | 4.2 | 150 | 120 | 105 | 100 |
| Dimethyl phthalate | 4.0 | 200 | 105 | 65 | 50 |
| Ditridecyl phthalate | 4.4 | 150 | 245 | 235 | 225 |
| Dibutyl sebacate | 4.1 | 50 | 25 | 20 | 15 |
| di-(2-ethylhexyl sebacate) | 4.1 | 35 | 95 | 95 | 90 |
| Dimethyl sebacate | 4.2 | 50 | 5 | — | — |
| n-butyl stearate | 4.2 | 125 | 280 | 160 | 140 |
| n-ethyl-o,p-toluene sulfonamide | 4.0 | 95 | 135 | 135 | 130 |

The plasticizers with the best one-container foam performance included diethylene glycol dibenzoate, dipropylene glycol dibenzoate, polyethylene glycol 200 dibenzoate, dimethyl isophthalate, chloroparaffin (60% chlorine), and diisodecyl phthalate. All foams prepared with these plasticizers had high foam expansion compared to non-plasticized formulations and had good volumetric stability. Of these, chloroparaffin (60% chlorine) had the best performance in terms of expansion and volumetric stability. In addition, chloroparaffin is a fire retardant. Plasticizers that showed poor foaming included acetyl triethyl citrate, acetyl tri-n-butyl citrate, tri-n-butyl citrate, butyl oleate, methyl oleate, n-propyl oleate, and tributyl phosphate.

Tests demonstrated the fire resistance of one-container foams containing chloroparaffin by applying a flame to their side and making observations on the flame and burning of the foams. Comparisons were made to commercially available foam. A propane-soldering torch was used to produce the flame. When the flame was kept in contact with chloroparaffin containing one-container foam, a flame emanated from the foam. When the propane was turned off, the flame on the foam immediately went out. The one-container foam would not support a flame when the source was removed and was therefore designated inflammable by this test.

In another embodiment, foam was dispensed from a container (vessel) through a valve. Because of the rapid expansion and blocking action of the foam in the valve and tube, a lubricant was added to facilitate transport of the foam through the tube and valve. One such lubricant was a fluorosurfactant (Zonyl® FSN, Aldrich Chemical Co.). This surfactant is not miscible with the foaming solution. It forms a separate phase and thereby acts as a lubricant. Using this lubricant, the foam could be fully dispensed from the vessel.

A test was performed by preparing a one-container foam solution in a 50 $cm^3$ stainless steel vessel. The one-container foam solution contained: 22.0 gram of polystyrene (molecular weight 280000 gram/mole), 14.7 gram of chloroparaffin plasticizer (60% chlorine), 3.67 gram of fluorosurfactant (Zonyl® FSN, Aldrich Chemical Co.), and 48.0 gram $CF_3I$. Foam was dispensed from the vessel by quickly opening a valve. The volume of foam dispensed was 3700 $cm^3$, corresponding to an expansion of 74:1. This formulation was tested for tube/valve dispensing at the temperature extremes expected for some possible applications, 15° C. and 55° C. At 15° C., the foam dispensed well and the tube was emptied. The volume of foam dispensed was 2700 $cm^3$ in one experiment (expansion of 54:1). At 55° C., the foam also dispensed well and the tube was emptied. The volume of foam dispensed was 3000 $cm^3$ in one experiment (expansion 60:1). Therefore, this foam dispenses in the temperature range of 15° C. to 55° C. The same result is expected for the other formulations in the method of the present invention.

In another embodiment to produce one container foam, a vessel would first be filled with $CF_3I$, the polymer, plasticizer, lubricants, and any other additives would be dissolved and then the vessel topped off with a certain pressure of either nitrogen, carbon dioxide, or other inert gas. A typical useful pressure was approximately 150 psi. Consistent foam deployment was obtained with this gas boost. A typical formulation for use in a 50 $m^3$ vessel (1-cm ID stainless steel) was: 22.0 gram polystyrene (280,000 gram/mole), 3.7 gram fluorosurfactant (Zonyl® FSN), 14.7 gram chloroparaffin (60% chlorine), 48.0 gram $CF_3I$, with the tube pressurized to 150 psi with carbon dioxide (base pressure of $CF_3I$ at 71 psi). The initial expansion ratio was 60:1, with an initial volume of 3000 $m^3$ (estimated density based upon solid content is 0.013 gm/cm3 or 0.84 lb/ft³).

In general, epoxy polymers and polyurethanes are not soluble in $CF_3I$ and could not be utilized in this invention. However, some epoxy prepolymers and urethane prepolymers can be utilized in this invention. By prepolymers, it is meant some low molecular weight polymers based upon epoxy or urethane chemistry that are not crosslinked or only have limited crosslinking. Some prepolymers can be purchased or can be synthesized. In some cases, they can be directly synthesized in $CF_3I$. For example, a diepoxy compound can be cured with diamine curative. If the diepoxy compound is first dissolved in $CF_3I$ and then less than the stoichiometric amount of the diamine curative is added to the solution (e.g. 45% of the stoichiometric amount, or typically in the range of 30% to 50%) and the resulting solution cured at 60° C., a low molecular weight epoxy polymer (that is, in this case, a prepolymer) will be formed that can often be soluble in $CF_3I$. This prepolymer can then be foamed by quick release of the pressure to form epoxy foam that has high expansion and is volumetrically stable. The foam produced is very adhesive.

Similarly polyurethane prepolymers can be synthesized in $CF_3I$ by reacting a diisocyanate with less than the stoichiometric about of a diol, curing at 60° C., and producing a low molecular weight urethane polymer than can be soluble in $CF_3I$. A polyurethane foam can then be similarly prepared by the rapid release of pressure.

For the purposes of describing the method of the present invention, the polymer that is dissolved in the liquefied gas is define to be either a polymer or a combination of reactants that subsequently form a polymer, such as the combination of the diepoxy with a diamine curative or a diisocyanate with a diol.

EXAMPLES

Example 1

One-Container Foam Using Polystyrene-Butadiene Copolymer

Very tough one-container foam is prepared by dissolving 2.0 gram of a multiblock copolymer (polystyrene-butadiene obtained from Firestone Polymers as Stereon 840 A) in 4.0 gram of $CF_3I$. The solution was prepared in a glass vial with the lid sealed with an epoxy adhesive. To dissolve the polymer, the vial was heated to 60° C. and turned every few hours for mixing. The foam was dispensed at room temperature by breaking open the glass vial. 200 $cm^3$ of very tough foam was produced with less than approximately 30 seconds. The foam had low volumetric stability with a volumetric half-life of less than 15 minutes.

Example 2

One-Container Foam Using Polystyrene-Butadiene Copolymer in $CF_3I$ and $CF_3CFH_2$ Very tough one-container foam is prepared by dissolving 2.0 grams of a multiblock copolymer (polystyrene-butadiene obtained from Firestone Polymers as Stereon 840A) in 3.6 grams of $CF_3I$ and 0.6 gram of $CF_3CFH_2$. The solution was prepared in a glass vial with the lid sealed with an epoxy adhesive. To dissolve the polymer, the vial was heated to 60° C. and turned every few hours for mixing. The foam was dispensed at room temperature by breaking open the glass vial. 190 $cm^3$ of very tough foam was produced. The foam had better volumetric stability than that formed in Example 1 with a volumetric half-life of 30 minutes.

Example 3

One-Container Foam Using Polystyrene-Butadiene Copolymer and Polystyrene

One-container foam is prepared by dissolving 0.8 grams of a multiblock copolymer (polystyrene-butadiene obtained from Firestone Polymers as Stereon 840A) and 1.2 gram of polystyrene (molecular weight 280000 gram/mole) in 3.6 grams of $CF_3I$ and 0.6 gram of $CF_3CFH_2$. The solution was prepared in a glass vial with the lid sealed with an epoxy adhesive. To dissolve the polymer, the vial was heated to 60° C. and turned every few hours for mixing. The foam was dispensed at room temperature by breaking open the glass vial. 130 cm³ of foam was produced. The foam was not as tough as those of Example 1 and Example 2. The foam had better volumetric stability than both the foams of Example 1 and Example 2 with a volumetric half-life of approximately 60 minutes.

Example 4

One-Container Foam Using Polystyrene and Chloroparaffin Plasticizer

One-container foam is prepared by dissolving 3.0 gram of polystyrene (molecular weight 280000 gram/mole), 2.0 gram of chloroparaffin plasticizer (60% chlorine), and 6.0 gram $CF_3I$ in a glass vial with the lid sealed with an epoxy adhesive. To dissolve the polymer, the vial was heated to 60° C. and turned every few hours for mixing. The foam was dispensed at room temperature by breaking open the glass vial. 500 cm³ of foam was produced corresponding to an expansion ratio of 75:1. The foam was quite tough and had excellent volumetric stability.

Example 5

One-Container Foam Using Polystyrene with Chloroparaffin Plasticizer and Surfactant One-container foam is prepared by dissolving 22.0 gram of polystyrene (molecular weight 280000 gram/mole), 14.7 gram of chloroparaffin plasticizer (60% chlorine), 3.67 gram of fluorosurfactant (Zonyl® FSN, Aldrich Chemical Co.), and 48.0 gram $CF_3I$ in a valved 1-cm diameter stainless steel vessel. To dissolve the polymer and other ingredients, the vessel was heated to 60° C. and turned every few hours for mixing. The vessel was the pressurized with 150 psi of carbon dioxide. Foam was dispensed at room temperature and produced 3700 cm³ of foam corresponding to an expansion of 74:1.

Example 6

One-Container Foam Using Polybutylmethacrylate/ Isobutylmethacrylate Copolymer

One-container foam is prepared by dissolving 3.0 gram of polybutylmethacrylate/isobutylmethacrylate copolymer, 1.0 gram of chloroparaffin plasticizer (60% chlorine), and 6.0 gram $CF_3I$ in a glass vial with the lid sealed with an epoxy adhesive. To dissolve the polymer, the vial was heated to 60° C. and turned every few hours for mixing. The foam was dispensed at room temperature by breaking open the glass vial. The foam was volumetrically stable. The foam was exceedingly adhesive. The volume could not be measured because of the adhesive nature but was estimated to be about 500 cm³.

Example 7

One-Container Foam Prepared Using Diepoxy and Diamine Curative

One-container epoxy foam is prepared by dissolving 3.0 gram of diepoxy (Epon™ 828 resin) and 0.38 gram diamine curative (Jeffamine® 230) and 4.0 gram $CF_3I$ in a glass vial with the lid sealed with an epoxy adhesive. The amount of diamine curative corresponds to approximately 40% of the stoichiometric amount. To cure the formed polymer, the vial was heated to 60° C. and turned every few hours for mixing for one day. Foam was dispensed at room temperature by breaking open the glass vial. The foam was volumetrically stable. The foam had good adhesive characteristics. The foam volume dispensed was approximately 240 cm³ that corresponded to an expansion ratio of approximately 49:1.

Example 8

One-Container Foam Prepared Using Diepoxy and Diamine Curatives

One-container epoxy foam is prepared by dissolving 3.0 gram of diepoxy (Epon™ 828 resin), 0.27 gram diamine curative (Jeffamine® 230), 0.95 gram diamine curative (Jeffamine® 2000), and 4.0 gram $CF_3I$ in a glass vial with the lid sealed with an epoxy adhesive. The amount of diamine curative corresponds to approximately 40% of the stoichiometric amount. To cure the formed polymer, the vial was heated to 60° C. and turned every few hours for mixing for one day. Foam was dispensed at room temperature by breaking open the glass vial. The foam was volumetrically stable. The foam had good adhesive characteristics. The foam volume dispensed was similar to that of Example 7.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a one-container foam, comprising:
   dissolving at least one polymer in a liquefied gas with vapor pressure $p_v$ to form a mixture in a sealable container at elevated pressure P; and
   vaporizing the liquefied gas by decreasing the elevated pressure P to a value below $p_v$ to form a one-container foam.

2. The method of claim 1 wherein said polymer is selected from polystyrene, a polystyrene copolymer, a poly (alphamethylstyrene), a poly(methylmethacrylate), a poly (n-butyl methacrylate), a poly(isobutylmethacrylate), a poly (t-butylaminoethylmethacrylate), a styrene ethylene-butylene triblock copolymer, a styrene-ethylene-butylene copolymer, a styrene-butadiene-styrene triblock copolymer, a styrene-isoprene-styrene triblock copolymer, a polybutadiene, a methacrylate copolymer, polyisoprene, polyethylene oxide, an epoxy polymer and a polyurethane polymer.

3. The method of claim 2 wherein the polystyrene copolymer is a polystyrene/butadiene copolymer.

4. The method of claim 2 wherein the methacrylate copolymer is a polybutylmethacrylate/isobutyl methacrylate copolymer.

5. The method of claim 1 wherein the liquefied gas comprises $CF_3I$ and mixtures thereof.

6. The mixture of claim 5 wherein the liquefied gas comprises a mixture of $CF_3I$ and a miscible gas cosolvent that is not a solvent for said polymer.

7. The method of claim 1 wherein the liquefied gas comprises a mixture of $CF_3I$ and $CF_3CFH_2$.

8. The method of claim 1 wherein the elevated pressure P is greater than approximately 100 psi.

9. The method of claim 1 wherein the elevated pressure P is less than approximate 150 psi.

10. The method of claim 1 wherein the mixture is heated to a temperature of less than approximately 60° C.

11. The method of claim 2 wherein the polystyrene has a molecular weight of greater than approximately 200,000 grams/mole.

12. The method of claim 2 wherein the polystyrene has a molecular weight of less than approximately 300,000 grams/mole.

13. The method of claim 1 wherein said mixture further comprises a plasticizer.

14. The method of claim 13 wherein said plasticizer is selected from the group consisting essentially of diethylene glycol dibenzoate, dipropylene glycol dibenzoate, polyethylene glycol 200 dibenzoate, dimethyl isophthalate, tetrahydrofurfuryl oleate, chloroparaffin, 2-ethylhexyl di-phenylphosphate, tricresyl phosphate, triphenyl phosphate, butyl benzyl phthalate, butyl octal phthalate, dicapryl phthalate, di-(2-ethylhexyl) phthalate, diethyl phthalate, diisobutyl phthalate, disodecyl phthalate, diisooctyl phthalate, dimethyl phthalate, ditridecyl phthalate, dibutyl sebacate, di-(2-ethylhexyl sebacate), dimethyl sebacate, n-butyl stearate, and n-ethyl-o,p-toluene sulfonamide.

15. The method of claim 1 wherein said mixture further comprises a surfactant.

16. The method of claim 1 wherein said mixture further comprises a lubricant.

17. The method of claim 16 wherein said lubricant is a fluorosurfactant.

18. The method of claim 1 wherein said one-container foam is inflammable.

19. The method of claim 1 wherein said at least one polymer is formed from mixing a diepoxy compound with a diamine curative.

20. The method of claim 1 wherein said at least one polymer is formed front mixing a diisocyanate with a diol.

21. The method of claim 1 wherein said one-container foam functions as a spray adhesive.

22. The method of claim 1 wherein said one-container foam is formed within less than approximately 60 seconds.

23. The method of claim 1 wherein the elevated pressure P is achieved by adding an inert gas to the sealable container.

* * * * *